(12) United States Patent
Watanabe

(10) Patent No.: US 12,448,101 B2
(45) Date of Patent: Oct. 21, 2025

(54) MARINE PROPULSION SYSTEM, OUTBOARD MOTOR, AND MARINE VESSEL

(71) Applicant: YAMAHA HATSUDOKI KABUSHIKI KAISHA, Iwata (JP)

(72) Inventor: Masahisa Watanabe, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 563 days.

(21) Appl. No.: 17/467,698

(22) Filed: Sep. 7, 2021

(65) Prior Publication Data
US 2022/0081090 A1    Mar. 17, 2022

(30) Foreign Application Priority Data

Sep. 16, 2020 (JP) ................... 2020-155363

(51) Int. Cl.
| | |
|---|---|
| *H02J 7/14* | (2006.01) |
| *B63H 20/00* | (2006.01) |
| *B63H 21/20* | (2006.01) |
| *B63H 23/12* | (2006.01) |

(52) U.S. Cl.
CPC ............ *B63H 21/20* (2013.01); *B63H 20/00* (2013.01); *B63H 2021/205* (2013.01); *B63H 23/12* (2013.01)

(58) Field of Classification Search
CPC . B63H 20/32; B63H 21/20; F02D 2041/0866; H02J 7/345; F02N 11/0866
See application file for complete search history.

(56) References Cited

U.S. PATENT DOCUMENTS

| | | | | |
|---|---|---|---|---|
| 9,004,961 | B1* | 4/2015 | French ................... | B63H 20/00 320/125 |
| 2004/0069251 | A1* | 4/2004 | Rzadki ...................... | H02J 4/00 123/3 |
| 2005/0173924 | A1 | 8/2005 | French | |
| 2018/0045309 | A1* | 2/2018 | Kamada .............. | F16H 63/3043 |
| 2018/0065723 | A1 | 3/2018 | Biebach et al. | |
| 2018/0256941 | A1* | 9/2018 | Robinson ............... | A63B 31/11 |
| 2019/0252734 | A1* | 8/2019 | Razzell .............. | H01M 10/425 |
| 2019/0311553 | A1 | 10/2019 | Kawase | |
| 2020/0126735 | A1* | 4/2020 | Johnson ................ | H01G 11/82 |

FOREIGN PATENT DOCUMENTS

| | | | |
|---|---|---|---|
| JP | 04150764 | A * | 5/1992 |
| JP | 2009148090 | A * | 7/2009 |
| JP | 2017103949 | A * | 6/2017 |
| JP | 2019-185196 | A | 10/2019 |

OTHER PUBLICATIONS

Official Communication issued in corresponding European Patent Application No. 21195264.3, mailed on Feb. 14, 2022.

* cited by examiner

*Primary Examiner* — Logan M Kraft
*Assistant Examiner* — Joshua Campbell
(74) *Attorney, Agent, or Firm* — Keating & Bennett, LLP

(57) ABSTRACT

A marine propulsion system includes an outboard motor installed on a hull and including an engine to drive a propulsion generator, and a generator to generate power by driving of the engine, a capacitor provided in the outboard motor to smooth the power generated by the generator and output the smoothed power to a device on a hull side, and a power distributor provided in the outboard motor to limit an output from the capacitor to the device on the hull side.

16 Claims, 5 Drawing Sheets

FIRST PREFERRED EMBODIMENT

FIRST PREFERRED EMBODIMENT

FIRST PREFERRED EMBODIMENT

FIRST PREFERRED EMBODIMENT

FIRST PREFERRED EMBODIMENT

FIRST PREFERRED EMBODIMENT

SECOND PREFERRED EMBODIMENT

THIRD PREFERRED EMBODIMENT

THIRD PREFERRED EMBODIMENT

MODIFIED EXAMPLE

MARINE PROPULSION SYSTEM, OUTBOARD MOTOR, AND MARINE VESSEL

CROSS REFERENCE TO RELATED APPLICATIONS

This application claims the benefit of priority to Japanese Patent Application No. 2020-155363 filed on Sep. 16, 2020. The entire contents of this application are hereby incorporated herein by reference.

BACKGROUND OF THE INVENTION

1. Field of the Invention

The present invention relates to a marine propulsion system, an outboard motor, and a marine vessel.

2. Description of the Related Art

A marine propulsion system, an outboard motor, and a marine vessel each including an engine are known in general. Such a marine propulsion system, an outboard motor, and a marine vessel are disclosed in Japanese Patent Laid-Open No. 2019-185196, for example.

Japanese Patent Laid-Open No. 2019-185196 discloses a small marine vessel including an outboard motor including an engine, a hull on which the outboard motor is installed, and a battery provided in the hull. The battery supplies power to an electronic device in the hull, a starter for the outboard motor, etc.

Although not clearly described in Japanese Patent Laid-Open No. 2019-185196, in a conventional outboard motor as described in Japanese Patent Laid-Open No. 2019-185196, a generator is provided to generate power by driving of an engine, and it is necessary to smooth an unstable output (power) (stabilize an output) generated by the generator by a battery provided in a hull and then supply it to an electronic device in the hull. That is, it is necessary to provide a structure in the hull to smooth the unstable power generated by the generator. Although not clearly described in Japanese Patent Laid-Open No. 2019-185196, in a conventional outboard motor as described in Japanese Patent Laid-Open No. 2019-185196, when the power consumption of an electronic device in a hull is large (in the case of an overload), an output from a battery to the electronic device in the hull increases. Therefore, it is necessary to provide a structure such as a voltage sensing relay in the hull to detect the voltage value of the battery, and cut off and limit an output from the battery to the electronic device in the hull when the voltage value of the battery becomes low in order to protect the power of the battery. Thus, the battery that smooths the unstable power generated by the generator and the voltage sensing relay are provided in the hull such that a relatively large space in the hull is occupied.

SUMMARY OF THE INVENTION

Preferred embodiments of the present invention provide marine propulsion systems, outboard motors, and marine vessels that each increase spaces for devices on hull sides of the marine vessels.

A marine propulsion system according to a preferred embodiment of the present invention includes an outboard motor installed on a hull and including an engine to drive a propulsion generator, and a generator to generate power by driving of the engine, a capacitor provided in the outboard motor to smooth the power generated by the generator and output the smoothed power to a device on a hull side, and a power distributor provided in the outboard motor to limit an output from the capacitor to the device on the hull side.

A marine propulsion system according to a preferred embodiment of the present invention includes the capacitor to smooth the power generated by the generator and output the smoothed power to the device on the hull side. Accordingly, the capacitor smooths the power generated by the generator (stabilizes the output). The capacitor is a device that stores power, and thus it is also used as a power supply in the outboard motor to supply power to the device on the hull side. Furthermore, the marine propulsion system includes the power distributor to limit the output from the capacitor to the device on the hull side. Accordingly, the power distributor protects (retains) the power of the power supply of the outboard motor including the capacitor. Thus, it is not necessary to provide a conventional battery on the hull side to smooth power, and a conventional voltage sensing relay on the hull side to limit an output from the outboard motor to the hull side, and thus a space for the device on the hull side is increased in the hull.

In a marine propulsion system according to a preferred embodiment of the present invention, the power distributor preferably limits the output from the capacitor to the device on the hull side based on the device on the hull side being in an overload state in which power equal to or higher than a first threshold is consumed. Accordingly, in the overload state in which the output (power output) from the capacitor is particularly high, the output from the capacitor to the device on the hull side is limited by the power distributor. Thus, the power of the capacitor is effectively protected (retained). Therefore, due to the power distributor being provided in the outboard motor, a space for the device on the hull side is increased in the hull, and the power of the capacitor is effectively protected (retained).

In such a case, the power distributor preferably includes a DC-DC converter to transform a DC voltage output from the capacitor to the device on the hull side, and to limit the output from the capacitor to the device on the hull side by at least one of turning off the DC-DC converter based on the device on the hull side being in the overload state or setting an upper limit for an output of the DC-DC converter. Accordingly, the DC-DC converter limits the output from the capacitor to the device on the hull side, and adjusts the value of the DC voltage output to the hull in the outboard motor.

In a marine propulsion system that limits the output from the capacitor to the device on the hull side based on the device on the hull side being in the overload state, the power distributor preferably includes a first relay switch to switch between an energization state and a cutoff state between the capacitor and the device on the hull side, and to switch the first relay switch from the energization state to the cutoff state based on the device on the hull side being in the overload state to limit the output from the capacitor to the device on the hull side. Accordingly, the output from the capacitor to the device on the hull side is limited by the first relay switch having a simple structure and provided in the outboard motor.

A marine propulsion system that limits the output from the capacitor to the device on the hull side based on the device on the hull side being in the overload state preferably further includes a charge control circuit to perform a control to limit a supply of power from the generator to the capacitor to charge the capacitor based on the device on the hull side being in a low load state in which power less than a second threshold that is smaller than the first threshold is consumed. Accordingly, the charge control circuit limits the supply of the power from the generator to the capacitor to charge the capacitor to prevent a large amount of power from being intensively supplied to the capacitor due to the low load state in which the output to the device on the hull side becomes low. Consequently, an excessive increase in the voltage value of the capacitor is significantly reduced or prevented.

A marine propulsion system according to a preferred embodiment of the present invention preferably further includes an electric starter to start the engine, and the capacitor preferably supplies to the starter power to start the engine. In general, a capacitor has a property such that a decrease in output due to a decrease in charging rate is relatively small (a range of a charging rate at which an engine is able to be started is relatively large) and a decrease in maximum output due to repeated charging is relatively small (the capacitor is hard to deteriorate). Therefore, with the structure described above, the capacitor improves the starting certainty at the time of starting the engine, in addition to smoothing the power generated by the generator.

In such a case, a marine propulsion system according to a preferred embodiment of the present invention preferably further includes a second relay switch to switch between an energization state and a cutoff state between the capacitor and the starter. Accordingly, the second relay switch is maintained in the cutoff state while the engine is stopped such that the dark current of the capacitor (discharging from the capacitor) is suppressed.

A marine propulsion system according to a preferred embodiment of the present invention preferably further includes a voltage sensor to detect a voltage value of the capacitor, and the marine propulsion system preferably limits the output from the capacitor to the device on the hull side based on the voltage value of the capacitor detected by the voltage sensor being less than a voltage threshold. Accordingly, the output from the capacitor to the device on the hull side is limited when the voltage value (charging rate) of the capacitor is low, and thus failure to fulfill the function of the capacitor such as starting the engine by the power of the capacitor is prevented.

In a marine propulsion system according to a preferred embodiment of the present invention, the device on the hull side preferably includes an electrically driven device and a hull-side battery to supply, to the electrically driven device, power to drive the electrically driven device, and the capacitor preferably charges the hull-side battery by smoothing the power generated by the generator and outputting the smoothed power to the hull-side battery. Accordingly, the hull-side battery supplies, to the electrically driven device, power to drive the electrically driven device even when the engine is stopped, and thus the use of the electrically driven device is continued even when the engine is stopped. When the capacitor is also used as a power supply in the outboard motor to supply power to the device on the hull side, the burden of power consumption of the battery on the hull side is reduced by the capacitor, and thus the hull-side battery is downsized as compared with the conventional battery provided on the hull side.

In such a case, the hull-side battery preferably includes a lithium-ion battery. Accordingly, due to the output smoothed by the capacitor, the lithium-ion battery that is required to be charged at a voltage of a specified value among secondary batteries is stably charged.

In a marine propulsion system according to a preferred embodiment of the present invention, the outboard motor preferably further includes a cowling to house the engine, and the capacitor and the power distributor are preferably provided in the cowling. Accordingly, the capacitor and the power distributor are provided in the cowling located at the uppermost portion of the outboard motor, and thus adhesion of water to the capacitor and the power distributor is prevented.

In a marine propulsion system according to a preferred embodiment of the present invention, the device on the hull side preferably includes an inverter to convert a direct current into an alternating current, and an electrically driven device driven by the alternating current from the inverter, and the capacitor preferably smooths the power generated by the generator and outputs the smoothed power to the electrically driven device via the inverter on the hull side. Accordingly, the DC voltage smoothed by the capacitor and output from the outboard motor is converted into an AC voltage by the inverter and output to the electrically driven device.

In such a case, the electrically driven device preferably includes an air conditioner to adjust an air condition in the hull, and the capacitor preferably smooths the power generated by the generator and outputs the smoothed power to the air conditioner via the inverter. Accordingly, the DC power generated by the generator is smoothed by the capacitor, converted into an AC voltage by the inverter, and output to the air conditioner to drive the air conditioner on the hull side.

An outboard motor according to a preferred embodiment of the present invention includes an engine to drive a propulsion generator, a generator to generate power by driving of the engine, a capacitor to smooth the power generated by the generator and output the smoothed power to a device on a hull side, and a power distributor to limit an output from the capacitor to the device on the hull side.

An outboard motor according to a preferred embodiment of the present invention includes the capacitor to smooth the power generated by the generator and output the smoothed power to the device on the hull side. Accordingly, the capacitor smooths the power generated by the generator (stabilizes the output). The capacitor stores power, and thus it is also used as a power supply in the outboard motor to supply power to the device on the hull side. Furthermore, the outboard motor includes the power distributor to limit output from the capacitor to the device on the hull side. Accordingly, the power distributor in the outboard motor protects (retains) the power of the power supply of the outboard motor including the capacitor. Thus, it is not necessary to provide a conventional battery on the hull side to smooth power, and a conventional voltage sensing relay on the hull side to limit an output from the outboard motor to the hull side, and thus a space for the device on the hull side is increased in the hull.

In an outboard motor according to a preferred embodiment of the present invention, the power distributor preferably limits the output from the capacitor to the device on the hull side based on the device on the hull side being in an overload state in which power equal to or higher than a threshold is consumed. Accordingly, in the overload state in which the output (power output) from the capacitor is particularly high, the output from the capacitor to the device on the hull side is limited by the power distributor. Thus, the power of the capacitor is effectively protected (retained). Therefore, due to the power distributor being provided in the outboard motor, a space for the device on the hull side is increased in the hull, and the power of the capacitor is effectively protected (retained).

In such a case, the power distributor preferably includes a DC-DC converter to transform a DC voltage output from the capacitor to the device on the hull side, and limits the output from the capacitor to the device on the hull side by at least one of turning off the DC-DC converter based on the device on the hull side being in the overload state or setting an upper limit for an output of the DC-DC converter. Accordingly, the DC-DC converter limits the output from the capacitor to the device on the hull side, and adjusts the value of the DC voltage output to the hull in the outboard motor.

In an outboard motor that limits the output from the capacitor to the device on the hull side based on the device on the hull side being in the overload state, the power distributor preferably includes a relay switch to switch between an energization state and a cutoff state between the capacitor and the device on the hull side, and to switch the relay switch from the energization state to the cutoff state based on the device on the hull side being in the overload state to limit the output from the capacitor to the device on the hull side. Accordingly, the output from the capacitor to the device on the hull side is limited by the relay switch having a simple structure and provided in the outboard motor.

An outboard motor according to a preferred embodiment of the present invention preferably further includes an electric starter to start the engine, and the capacitor preferably supplies to the starter power to start the engine. In general, a capacitor has a property such that a decrease in output due to a decrease in charging rate is relatively small (a range of a charging rate at which an engine is able to be started is relatively large) and a decrease in maximum output due to repeated charging is relatively small (the capacitor is hard to deteriorate). Therefore, with the structure described above, the capacitor improves the starting of the engine, in addition to smoothing the power generated by the generator.

A marine vessel according to a preferred embodiment of the present invention includes a hull, an outboard motor installed on the hull and including an engine to drive a propulsion generator, and a generator to generate power by driving of the engine, a capacitor provided in the outboard motor to smooth the power generated by the generator and output the smoothed power to a device on a hull side, and a power distributor provided in the outboard motor to limit an output from the capacitor to the device on the hull side.

A marine vessel according to a preferred embodiment of the present invention includes the capacitor to smooth the power generated by the generator and output the smoothed power to the device on the hull side. Accordingly, the capacitor smooths the power generated by the generator (stabilizes the output). The capacitor stores power, and thus it is also used as a power supply in the outboard motor to supply power to the device on the hull side. Furthermore, the marine vessel includes the power distributor to limit the output from the capacitor to the device on the hull side. Accordingly, the power distributor protects (retains) the power of the power supply of the outboard motor including the capacitor. Thus, it is not necessary to provide a conventional battery on the hull side to smooth power, and a conventional voltage sensing relay on the hull side to limit an output from the outboard motor to the hull side, and thus a space for the device on the hull side is increased in the hull.

In a marine vessel according to a preferred embodiment of the present invention, the power distributor preferably limits the output from the capacitor to the device on the hull side based on the device on the hull side being in an overload state in which power equal to or higher than a threshold is consumed. Accordingly, in the overload state in which the output (power output) from the capacitor is particularly high, the output from the capacitor to the device on the hull side is limited by the power distributor. Thus, the power of the capacitor is effectively protected (retained). Therefore, due to the power distributor provided in the outboard motor, a space for the device on the hull side is increased in the hull, and the power of the capacitor is effectively protected (retained).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is now described with reference to FIGS. 1 to 6. In the figures, arrow FWD represents the forward movement direction of the marine vessel 100, and arrow BWD represents the reverse movement direction of the marine vessel 100.

Figure 1:
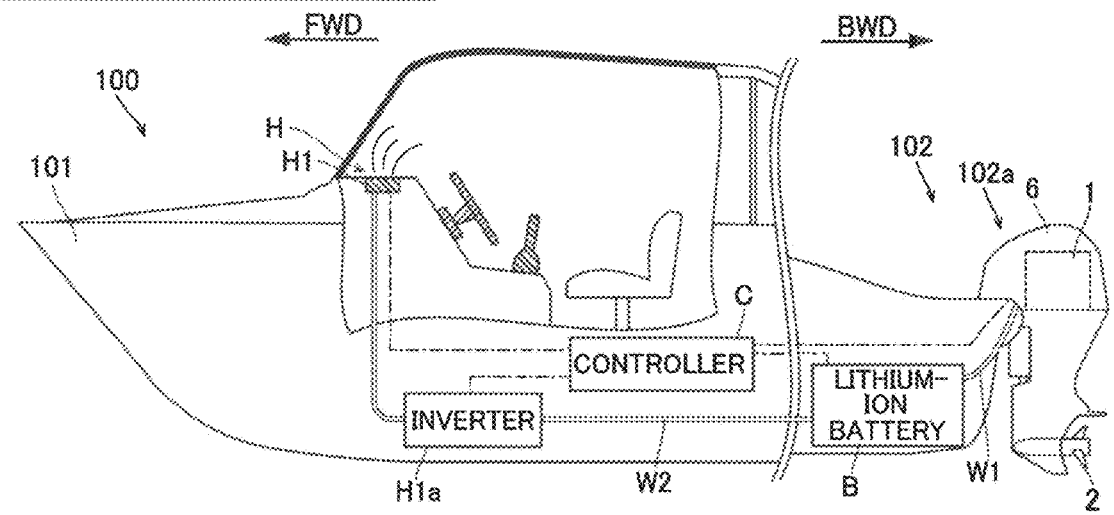
FIG. 1 is a schematic view showing a marine vessel including a marine propulsion system according to a first preferred embodiment of the present invention.

As shown in FIG. 1, the marine vessel 100 includes a hull 101 and a marine propulsion system 102 provided on the hull 101.

The marine propulsion system 102 includes an outboard motor 102a, a lithium-ion battery B, and a controller C. The lithium-ion battery B is provided on the hull 101 side and is electrically connected to a capacitor (condenser) 7 (see FIG. 2) of the outboard motor 102a described below. The outboard motor 102a is installed at the stern (transom) of the hull 101. That is, the marine vessel 100 is an outboard motor boat. The lithium-ion battery B is an example of a "device on a hull side" or a "hull-side battery".

The hull 101 includes the lithium-ion battery B electrically connected to the capacitor 7 of the outboard motor 102a described below, a house device H including various devices driven by electricity, such as an air conditioner H1 that adjusts an air condition in the hull 101, the controller C, and a key switch. The air conditioner H1 is an example of an "electrically driven device". The house device H is an example of a "device on a hull side".

The house device H is provided between the air conditioner H1 and the lithium-ion battery B, and includes an inverter H1a to convert a direct current into an alternating current. The air conditioner H1 is driven by the alternating current from the inverter H1a.

Figure 2:
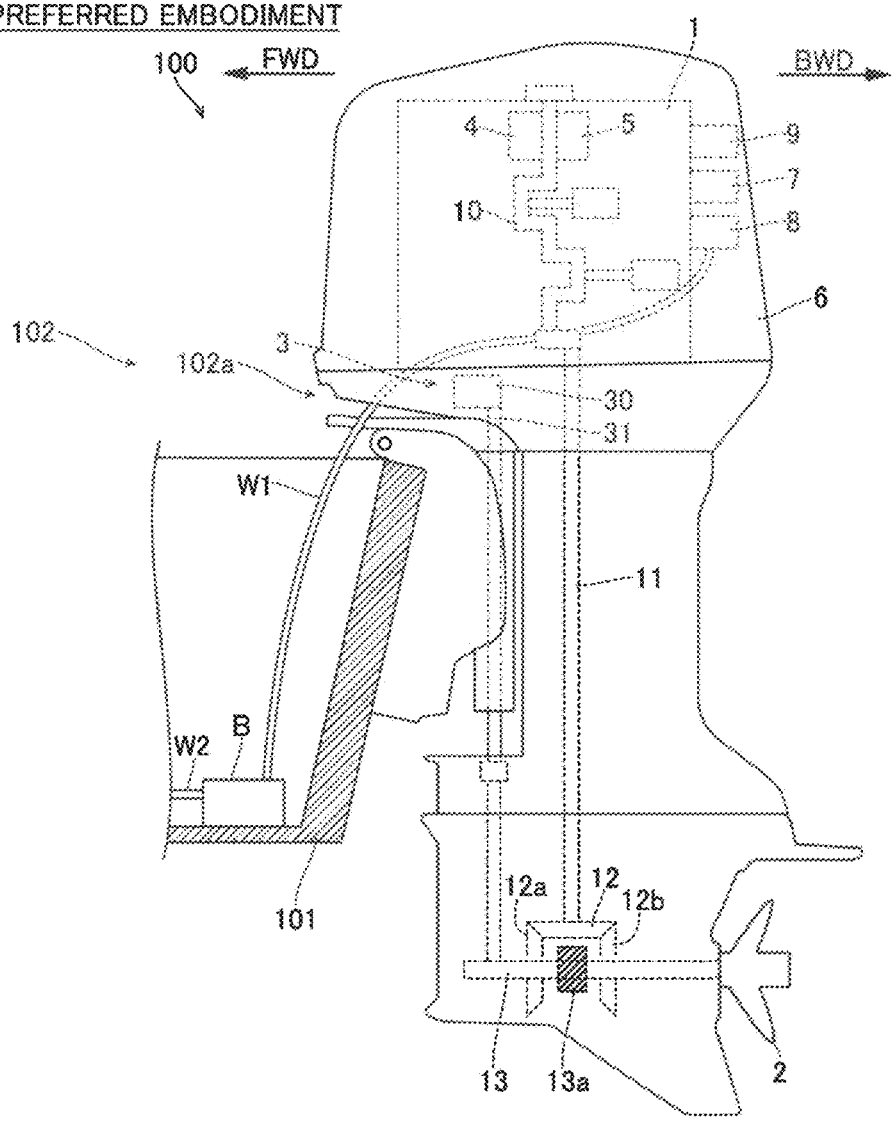
FIG. 2 is a side view illustrating the structure of an outboard motor according to the first preferred embodiment of the present invention.

As shown in FIG. 2, the lithium-ion battery B is electrically connected to a first end of a wiring W1 in the hull 101. A second end of the wiring W1 is electrically connected to a DC-DC converter 8 of the outboard motor 102a described below in a cowling 6 of the outboard motor 102a. A generator 5 described below in an engine 1 supplies, to the lithium-ion battery B, power to charge the lithium-ion battery B when the engine 1 is started and driven.

The lithium-ion battery B is electrically connected to the house device H by a wiring W2. The lithium-ion battery B supplies, to the air conditioner H1, power to drive the air conditioner H1 via the wiring W2 and the inverter H1a. Therefore, the marine propulsion system 102 drives the house device H using the power of the lithium-ion battery B even when the generator 5 does not generate power and the engine 1 is stopped.

The controller C controls driving of each portion of the hull 101 and performs a control to transmit a signal related to marine vessel maneuvering, a signal related to the house device H, etc., to the outboard motor 102a (controller 9).

The controller C knows the overall load state of the house device H (acquires a power consumption value). As an example, the controller C detects the voltage value of the lithium-ion battery B and knows the load state of the house device H. Alternatively, the controller C may measure a value of a current that flows through the house device H and know the overall load state of the house device H. Alternatively, the controller C may acquire predetermined information regarding the load state of the house device H from the house device H and know the overall load state of the house device H. A method for the controller C to determine the overall load state of the house device H is not limited to the above. The controller C on the hull 101 side transmits load information L (such as the total power consumption value of the house device H) regarding the known overall load state of the house device H to the controller 9 of the outboard motor 102a.

Figure 3:
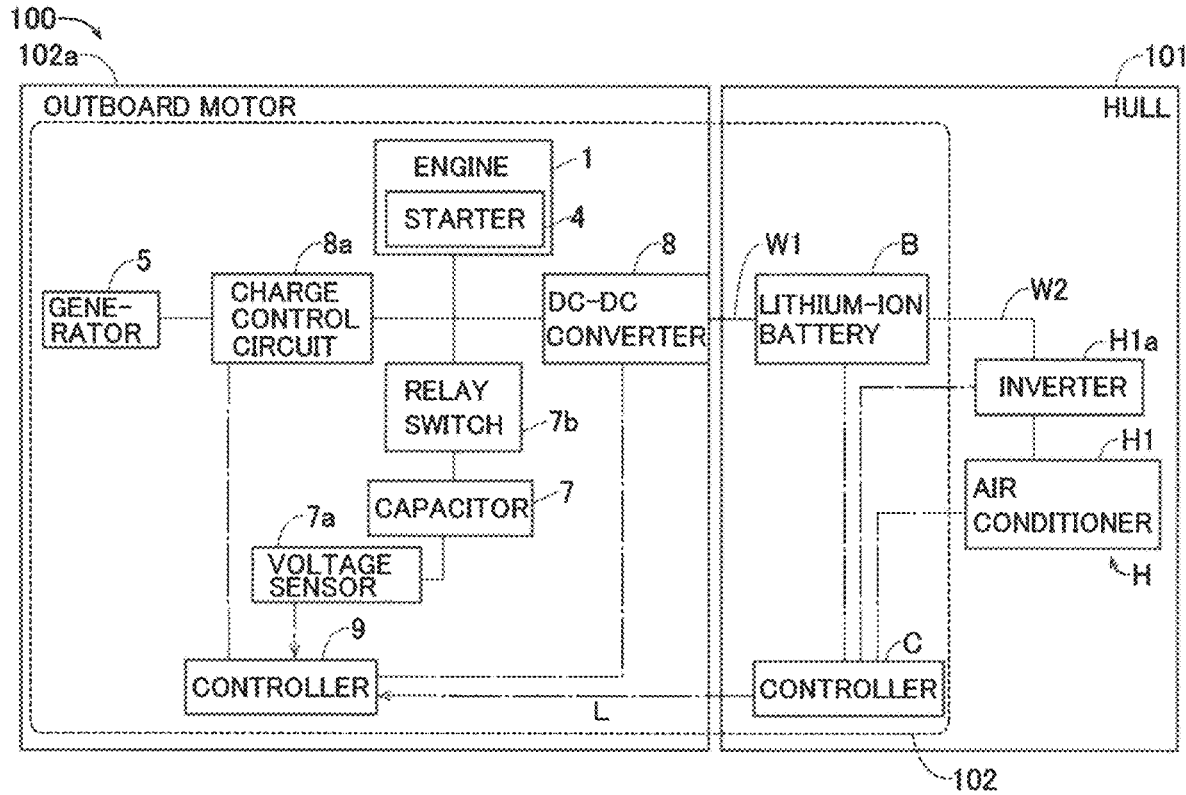
FIG. 3 is a block diagram of the marine propulsion system according to the first preferred embodiment of the present invention.
Figure 4:
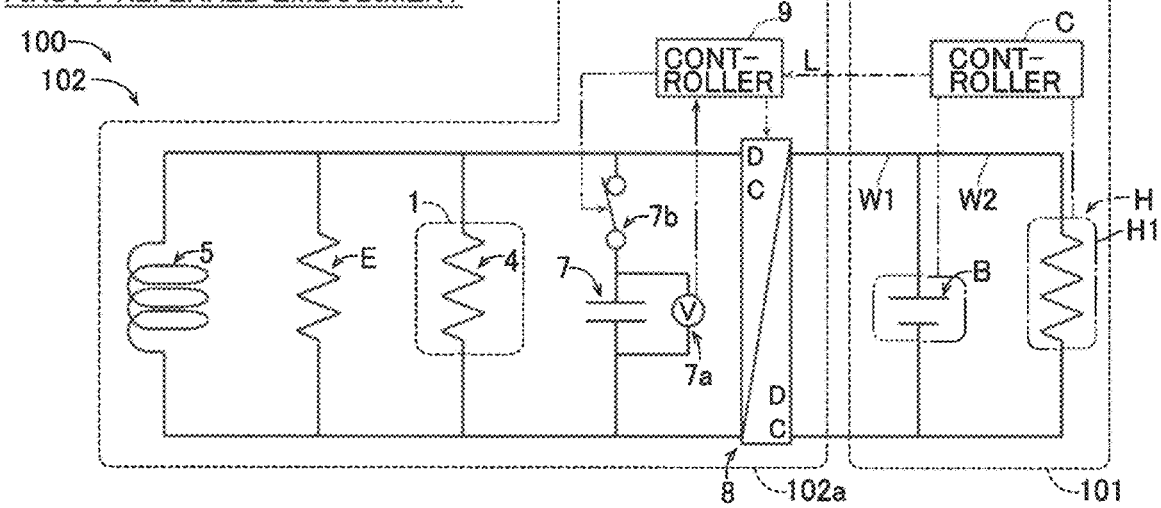
FIG. 4 is a diagram schematically showing a circuit including a capacitor and a DC-DC converter of the marine propulsion system according to the first preferred embodiment of the present invention.

As shown in FIGS. 2 to 4, the outboard motor 102a includes the engine 1, a propulsion generator 2, a shift device 3, a starter 4, the generator 5, the cowling 6, the capacitor 7, a voltage sensor 7a, a relay switch 7b, the DC-DC converter 8, a charge control circuit 8a, and the controller 9. The relay switch 7b is an example of a "second relay switch". The DC-DC converter 8 is an example of a "power distributor".

The engine 1 drives the propulsion generator 2. The propulsion generator 2 includes a propeller to generate a propulsive force by rotation.

The engine 1 is an internal combustion engine driven by explosive combustion of fuel. The outboard motor 102a transmits a driving force (torque) from a crankshaft 10 of the engine 1 to a drive shaft 11, an intermediate gear 12, a drive gear (one of a forward gear 12a and a reverse gear 12b), a clutch 13a, and a propeller shaft 13 in this order to rotate the propulsion generator 2.

Specifically, the intermediate gear 12 is provided at the lower end of the drive shaft 11 that extends in an upward-downward direction. The intermediate gear 12 is positioned between the forward gear 12a positioned on the front side and the reverse gear 12b positioned on the rear side in a forward-rearward direction. The intermediate gear 12 constantly meshes with the forward gear 12a and the reverse gear 12b. The intermediate gear 12, the forward gear 12a, and the reverse gear 12b are all bevel gears. The forward gear 12a and the reverse gear 12b rotate in opposite directions on a central axis coaxial with the rotation central axis of the propeller shaft 13.

The clutch 13a is a dog clutch. The clutch 13a is provided on the propeller shaft 13 and rotates together with the propeller shaft 13. The clutch 13a is sandwiched between the forward gear 12a and the reverse gear 12b in the forward-rearward direction.

The clutch 13a is moved in the forward-rearward direction by the shift device 3 to switch the outboard motor 102a to one of three driving states including a "neutral state", a "forward movement state (non-neutral state)", and a "reverse movement state (non-neutral state)".

The "neutral state" refers to a state in which the clutch 13a is located at an intermediate position spaced apart from the forward gear 12a and the reverse gear 12b so as to not mesh with the forward gear 12a and the reverse gear 12b, and an idling state in which a driving force is not transmitted from the engine 1 to the propeller shaft 13. As an example, in the idling state, the engine 1 idles without transmitting a driving force to the propulsion generator 2 while rotating at a rotation speed of 500 rpm or more and 600 rpm or less.

The "forward movement state" refers to a state in which the clutch 13a is moved forward, the clutch 13a meshes only with the forward gear 12a, and the marine vessel 100 moves forward. The "reverse movement state" refers to a state in which the clutch 13a is moved rearward, the clutch 13a meshes only with the reverse gear 12b, and the marine vessel 100 moves rearward.

The shift device 3 includes a shift operator (not shown) including an operation lever operated by a user, a shift actuator 30, and a shift shaft 31. The shift actuator 30 receives, from the shift operator via the controller 9, a predetermined signal to switch the shift state. Consequently, the shift actuator 30 moves the shift shaft 31 in the forward-rearward direction to switch the outboard motor 102a to one of the three driving states including the "neutral state", the "forward movement state", and the "reverse movement state".

The starter 4 is an electric starter to start the engine 1. The starter 4 includes a starter motor. Alternatively, the starter may include a flywheel magnet or an integrated starter generator (ISG) such as an alternator.

The generator 5 generates power by driving of the engine 1. That is, the generator 5 is a so-called alternating current (AC) generator to generate power as the crankshaft 10 rotates. The generator 5 includes an alternator. Alternatively, the generator 5 may include a flywheel magnet, for example, instead of an alternator. The generator 5 includes an inverter (not shown) to convert a generated alternating current into a direct current.

The cowling 6 is a removable housing cover to house the engine 1. In addition to the engine 1, the starter 4, the generator 5, the capacitor 7, the voltage sensor 7a, the relay switch 7b, the controller 9, etc. are located in the cowling 6. The cowling 6 is located at the uppermost portion among all components of the outboard motor 102a. The cowling 6 covers various structures such as the capacitor 7 located in the cowling 6 such that water does not adhere to the various structures.

The capacitor 7 includes a power storage device having a higher power density than a lead storage battery, such as an electric double-layer capacitor or a lithium-ion capacitor. Alternatively, the capacitor 7 may include a capacitor including an electrode, for example, made of a different material from those of an electric double-layer capacitor and a lithium-ion capacitor.

The capacitor 7 is located in the outboard motor 102a. Specifically, the capacitor 7 is located in the cowling 6.

The capacitor 7 is electrically connected to the lithium-ion battery B in the hull 101 via the DC-DC converter 8 and the wiring W1. The capacitor 7 is electrically connected to the starter 4 in the outboard motor 102a. The capacitor 7 is electrically connected to an electrical component E of the engine 1 in the outboard motor 102a. The capacitor 7 is electrically connected to the generator 5 in the outboard motor 102a. The capacitor 7 is connected in parallel to the lithium-ion battery B, the starter 4, the electrical component E, and the generator 5 in the circuit. The electrical component E includes various circuit configurations such as the controller 9.

The capacitor 7 smooths (stabilizes) the power generated by the generator 5 and outputs the smoothed power to the lithium-ion battery B and the house device H via the DC-DC converter 8 and the wiring W1. Thus, the capacitor 7 charges the lithium-ion battery B. Specifically, the capacitor 7 smooths (stabilizes) the power generated by the generator 5 and outputs the smoothed power to the air conditioner H1 via the inverter H1a. In general, when the charging current of a lithium-ion battery is larger than a specified value, lithium gas is generated in a negative electrode, for example, and the battery life may be shortened. Therefore, the lithium-ion battery is particularly required to be charged at a voltage of a specified value as compared with other secondary batteries.

Therefore, the marine propulsion system 102 smooths (stabilizes) an output from the outboard motor 102a by the capacitor 7 in the outboard motor 102a, and thus it is particularly effective to charge the lithium-ion battery B.

The capacitor 7 supplies to the starter 4 power to start (crank) the engine 1. Furthermore, the capacitor 7 supplies, to the electrical component E, power to drive the electrical component E.

The voltage sensor 7a detects the voltage value of the capacitor 7. That is, the voltage sensor 7a detects a voltage between a pair of electrodes of the capacitor 7. The voltage value of the capacitor 7 detected by the voltage sensor 7a is acquired by the controller 9.

The relay switch 7b is a switch to suppress the dark current of the capacitor 7. Specifically, the relay switch 7b is connected in series to the capacitor 7, and switches between an energization state and a cutoff state between the capacitor 7 and the starter 4.

When the engine 1 is stopped, the relay switch 7b is in a cutoff state (open state) and significantly reduces or prevents discharging from the capacitor 7. When the engine 1 is started and driven, the relay switch 7b is in an energization state (closed state), and the capacitor 7 is able to be discharged. The relay switch 7b is driven and controlled by the controller 9.

Even when the outboard motor 102a is not used for a relatively long period of time, the relay switch 7b is maintained in a cutoff state such that a decrease in the SOC (state of charge: charging rate) of the capacitor 7 due to the dark current is reduced or minimized, and the SOC is maintained in a larger state. Therefore, the outboard motor 102a more reliably starts the engine 1 using the power of the capacitor 7.

The DC-DC converter 8 is located in the outboard motor 102a. Specifically, the DC-DC converter 8 is located in the cowling 6.

The DC-DC converter 8 transforms a DC voltage output from the capacitor 7 to the lithium-ion battery B and the house device H. As an example, the DC-DC converter 8 steps down the DC voltage generated by the generator 5 and output from the capacitor 7 to the lithium-ion battery B and the house device H from 48 [V] to 12 [V], for example.

The DC-DC converter 8 is switchable between an on state in which power passes through the DC-DC converter 8 and an off state (stop state) in which power does not pass through the DC-DC converter 8. That is, the DC-DC converter 8 limits an output from the capacitor 7 to the hull 101 side (lithium-ion battery B) in the off state. The on state and off state of the DC-DC converter 8 are switched by the controller 9. The on state and the off state of the DC-DC converter 8 are switched by the controller 9 in consideration of the overall load state of the house device H, for example.

In the DC-DC converter 8, an upper limit is set for an output (passing power) from the capacitor 7 to the hull 101 side (lithium-ion battery B). That is, the DC-DC converter 8 freely changes an output (passing power) from the capacitor 7 to the hull 101 side (lithium-ion battery B). The upper limit of the output (passing power) of the DC-DC converter 8 is set by the controller 9 in consideration of the overall load state of the house device H, for example.

The charge control circuit 8a is located between the generator 5 and the capacitor 7. The charge control circuit 8a performs a control to limit a supply of power from the generator 5 to the capacitor 7 to charge the capacitor 7 (charging from the generator 5 to the capacitor 7) based on the house device H being in a low load state. The house device H being in the low load state indicates that the total power consumption value of the house device H is less than a predetermined second threshold. In the low load state, an output to the house device H becomes low, and thus the voltage value of the capacitor 7 becomes excessively high, which is not preferable.

As an example, the charge control circuit 8a acquires the total power consumption value of the house device H via the controller C on the hull 101 side and the controller 9 of the outboard motor 102a, and determines whether or not the house device H is in the low load state. The second threshold is smaller than a first threshold described below.

Figure 5:
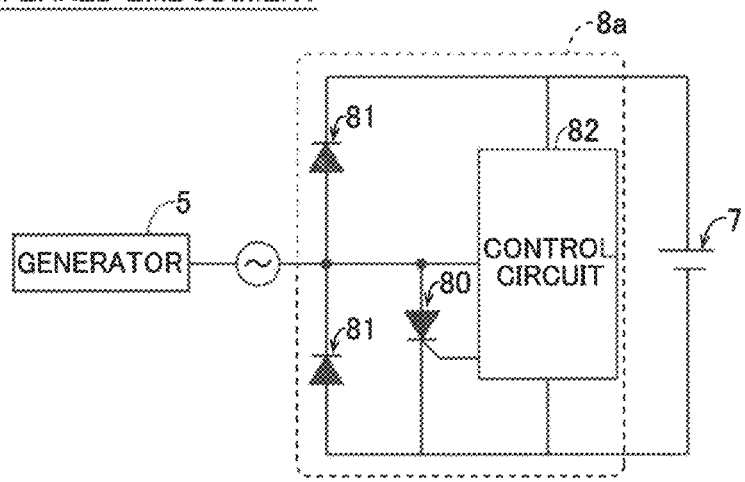
FIG. 5 is a diagram showing a charge control circuit of the outboard motor according to the first preferred embodiment of the present invention.

As shown in FIG. 5, the charge control circuit 8a includes a switching element 80, diodes 81, and a control circuit 82 to control the switching element 80. The control circuit 82 shorts a current from the generator 5 to the capacitor 7 to ground by the switching element 80 when the house device H is in the low load state. Thus, the charge control circuit 8a prevents a current from flowing through the capacitor (charging to the capacitor 7). Driving of the charge control circuit 8a is controlled by the controller 9.

The controller 9 shown in FIGS. 3 and 4 is located in the outboard motor 102a. Specifically, the controller 9 is located in the cowling 6 (see FIG. 2). The controller 9 includes a circuit board including a central processing unit (CPU), a read-only memory (ROM), a random access memory (RAM), etc., for example.

The controller 9 performs a control to limit an output from the capacitor 7 to the lithium-ion battery B and the house device H based on the house device H being in an overload state in which power equal to or higher than the first threshold is consumed.

The controller 9 limits an output from the capacitor 7 to the house device H by turning off the DC-DC converter 8 based on the house device H being in the overload state and setting an upper limit for the output of the DC-DC converter 8.

When determining the load state of the house device H, the controller 9 receives the load information L (such as the total power consumption value of the house device H) regarding the overall load state of the house device H from the controller C on the hull 101 side.

Then, the controller 9 determines whether the (entire) house device H is in the overload state in which power equal to or higher than the first threshold is consumed, in an intermediate load state in which power less than the first threshold and equal to or higher than the second threshold is consumed, or in the low load state in which power less than the second threshold is consumed based on the load information L.

The controller 9 limits an output from the capacitor 7 to the house device H based on the voltage value of the capacitor 7 detected by the voltage sensor 7a being less than a voltage threshold. That is, the controller 9 performs a control to leave power in the capacitor 7 such that the capacitor 7 is able to start the engine 1.

Figure 6:
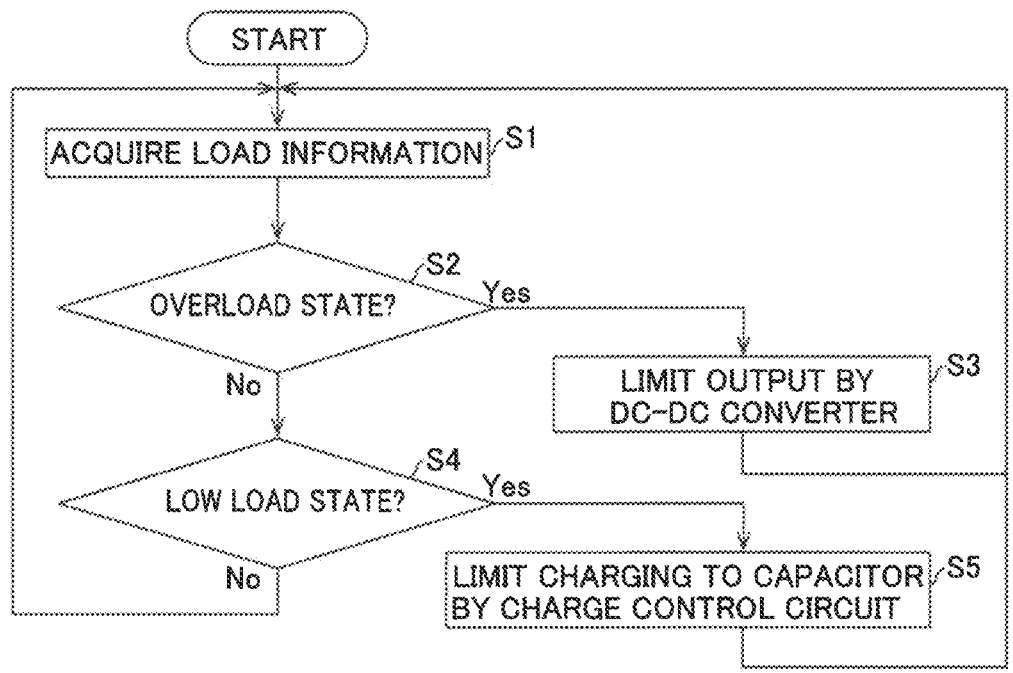
FIG. 6 is a flowchart of a control process performed by a controller of the outboard motor according to the first preferred embodiment of the present invention.

A flow of a control process performed by the controller 9 of the outboard motor 102a is now described based on the load state of the house device H with reference to FIG. 6.

First, in step S1, the load information L (information on the total power consumption value of the house device H, for example) (see FIG. 3) indicating the load state of the house device H is acquired from the controller C on the hull 101 side. Then, the process advances to step S2.

Then, in step S2, it is determined whether or not the house device H is in the overload state. That is, it is determined whether or not the house device H is in a state in which power equal to or higher than the first threshold is consumed. When the house device H is in the overload state, the process advances to step S3, and when the house device H is not in the overload state, the process advances to step S4.

Then, in step S3, an output to the lithium-ion battery B and the house device H is limited by the DC-DC converter 8. Specifically, the output is limited by turning off the DC-DC converter 8 or setting a predetermined upper limit for the output of the DC-DC converter 8. Then, the process returns to step S1.

In step S4, it is determined whether or not the house device H is in the low load state. That is, it is determined whether or not the house device H is in a state in which power less than the second threshold is consumed. When the house device H is in the low load state, the process advances to step S5, and when the house device H is not in the low load state, the process returns to step S1.

Then, in step S5, charging to the capacitor 7 is limited by the charge control circuit 8a. That is, the charge control circuit 8a prevents the voltage value of the capacitor 7 from becoming excessively high.

When the process returns from step S4 to step S1 (when the (entire) house device H is in the intermediate load state), the control in step S3 (controlling the DC-DC converter 8 to limit the output) and the control in step S5 (the control of the charge control circuit 8a to limit charging to the capacitor 7) are released when the control in step S3 and the control in step S5 are being performed.

According to the first preferred embodiment of the present invention, the following advantageous effects are achieved.

According to the first preferred embodiment of the present invention, the marine propulsion system 102 includes the capacitor 7 provided in the outboard motor 102a to smooth the power generated by the generator 5 and output the smoothed power to the house device H. Accordingly, the capacitor 7 in the outboard motor 102a smooths the power generated by the generator 5 (stabilizes the output). The capacitor 7 stores power, and thus it is also used as a power supply in the outboard motor 102a to supply power to the house device H. Furthermore, the marine propulsion system 102 includes the power distributor (DC-DC converter 8) provided in the outboard motor 102a to limit an output from the capacitor 7 to the house device H. Accordingly, the power distributor in the outboard motor 102a protects (retains) the power of the power supply of the outboard motor 102a including the capacitor 7. Thus, it is not necessary to provide a conventional battery on the hull 101 side to smooth power, and a conventional voltage sensing relay on the hull 101 side to limit an output from the outboard motor 102a to the hull 101 side, and thus a space for the house device H is increased in the hull.

According to the first preferred embodiment of the present invention, the power distributor (DC-DC converter 8) provided in the outboard motor 102a limits an output from the capacitor 7 to the house device H based on the house device H being in the overload state in which power equal to or higher than the first threshold is consumed. Accordingly, in the overload state in which the output (power output) from the capacitor 7 is particularly high, the output from the capacitor 7 to the house device H is limited by the power distributor. Thus, the power of the capacitor 7 is effectively protected (retained). Therefore, due to the power distributor provided in the outboard motor 102a, a space for the house device H is increased in the hull, and the power of the capacitor 7 is effectively protected (retained).

According to the first preferred embodiment of the present invention, the power distributor provided in the outboard motor 102a includes the DC-DC converter 8 to transform the DC voltage output from the capacitor 7 to the house device H, and limits an output from the capacitor 7 to the house device H by turning off the DC-DC converter 8 based on the house device H being in the overload state and setting an upper limit for the output of the DC-DC converter 8. Accordingly, the DC-DC converter 8 limits the output from the capacitor 7 to the house device H, and adjusts the value of the DC voltage output to the hull 101 in the outboard motor 102a.

According to the first preferred embodiment of the present invention, the marine propulsion system 102 further includes the charge control circuit 8a to perform a control to limit the supply of power from the generator 5 to the capacitor 7 to charge the capacitor 7 based on the house device H being in the low load state in which power less than the second threshold that is smaller than the first threshold is consumed. Accordingly, the charge control circuit 8a limits the supply of the power to charge the capacitor 7 from the generator 5 to the capacitor 7 to prevent a large amount of power from being intensively supplied to the capacitor 7 due to the low load state in which the output to the house device H becomes low. Consequently, an excessive increase in the voltage value of the capacitor 7 is significantly reduced or prevented.

According to the first preferred embodiment of the present invention, the marine propulsion system 102 further includes the electric starter 4 to start the engine 1, and the capacitor 7 supplies to the starter 4 power to start the engine 1. In general, a capacitor has a property such that a decrease in output due to a decrease in charging rate is relatively small (a range of a charging rate at which an engine is able to be started is relatively large) and a decrease in maximum output due to repeated charging is relatively small (the capacitor is hard to deteriorate). Therefore, with the structure described above, the capacitor 7 improves the starting of the engine 1, in addition to smoothing the power generated by the generator 5.

According to the first preferred embodiment of the present invention, the marine propulsion system 102 further includes the relay switch 7b to switch between the energization state and the cutoff state between the capacitor 7 and the starter 4. Accordingly, the relay switch 7b is maintained in the cutoff state while the engine 1 is stopped such that the dark current of the capacitor 7 (discharging from the capacitor 7) is suppressed.

According to the first preferred embodiment of the present invention, the marine propulsion system 102 further includes the voltage sensor 7a to detect the voltage value of the capacitor 7, and limits an output from the capacitor 7 to the house device H based on the voltage value of the capacitor 7 detected by the voltage sensor 7a being less than the voltage threshold. Accordingly, the output from the capacitor 7 to the house device H is limited when the voltage value (charging rate) of the capacitor 7 is low, and thus failure to fulfill the function of the capacitor 7 such as starting the engine 1 by the power of the capacitor 7 is prevented.

According to the first preferred embodiment of the present invention, the house device H includes the electrically driven device (air conditioner H1) and the hull-side battery (lithium-ion battery B) to supply, to the electrically driven device, power to drive the electrically driven device, and the capacitor 7 charges the hull-side battery by smoothing the power generated by the generator 5 and outputting the smoothed power to the hull-side battery. Accordingly, the hull-side battery supplies, to the electrically driven device, power to drive the electrically driven device even when the engine 1 is stopped, and thus the use of the electrically driven device is continued even when the engine 1 is stopped. When the capacitor 7 is also used as a power supply in the outboard motor 102a to supply power to the house device H, the burden of power consumption of the battery on the hull 101 side is reduced by the capacitor 7, and thus the battery on the hull 101 side is downsized as compared with the conventional battery on the hull side.

According to the first preferred embodiment of the present invention, the hull-side battery includes a lithium-ion battery B. Accordingly, due to the output smoothed by the capacitor 7, the lithium-ion battery B that is required to be charged at a voltage of a specified value among secondary batteries is stably charged.

According to the first preferred embodiment of the present invention, the outboard motor 102a includes the cowling 6 to house the engine 1, and the capacitor 7 and the power distributor (DC-DC converter 8) are provided in the cowling 6. Accordingly, the capacitor 7 and the power distributor are provided in the cowling 6 located at the uppermost portion of the outboard motor 102a, and thus adhesion of water to the capacitor 7 and the power distributor is prevented.

According to the first preferred embodiment of the present invention, the house device H includes the inverter H1a to convert a direct current into an alternating current, and the electrically driven device (air conditioner H1) driven by the alternating current from the inverter H1a, and the capacitor 7 smooths the power generated by the generator 5 and outputs the smoothed power to the electrically driven device via the inverter H1a on the hull 101 side. Accordingly, the DC voltage smoothed by the capacitor 7 and output from the outboard motor 102a is converted into an AC voltage by the inverter H1a and output to the electrically driven device.

According to the first preferred embodiment of the present invention, the electrically driven device includes the air conditioner H1 to adjust the air condition in the hull 101, and the capacitor 7 smooths the power generated by the generator 5 and outputs the smoothed power to the air conditioner H1 via the inverter H1a. Accordingly, the DC power generated by the generator 5 is smoothed by the capacitor 7, converted into an AC voltage by the inverter H1a, and output to the air conditioner H1 to drive the air conditioner H1 on the hull 101 side.

Second Preferred Embodiment

Figure 7:
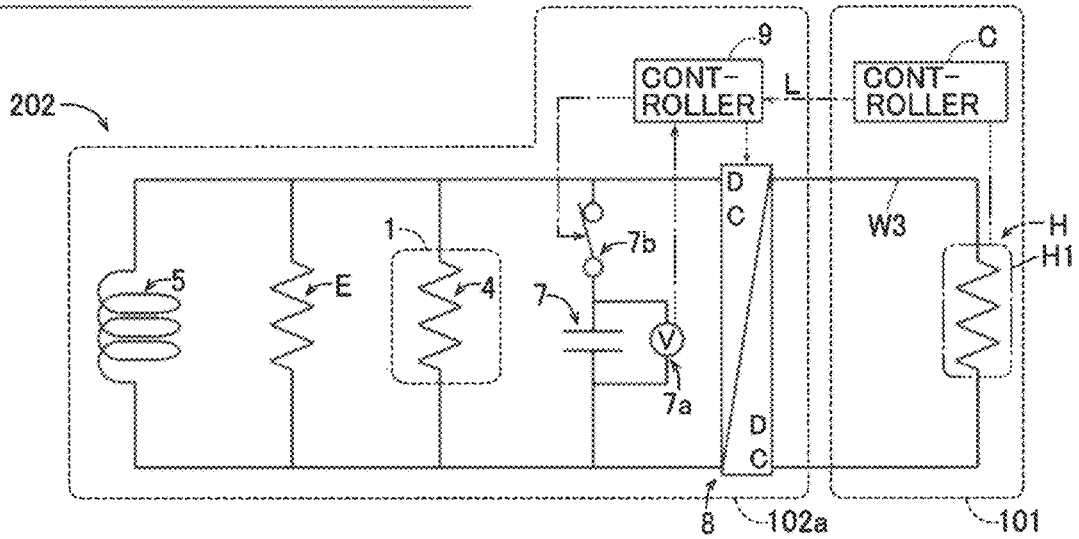
FIG. 7 is a diagram schematically showing a circuit including a capacitor and a DC-DC converter of a marine propulsion system according to a second preferred embodiment of the present invention.

A second preferred embodiment of the present invention is now described with reference to FIG. 7. In the second preferred embodiment, a marine propulsion system 202 does not include a lithium-ion battery in a hull 101, unlike the first preferred embodiment in which the marine propulsion system 102 includes the lithium-ion battery B in the hull 101. The same or similar structures as those of the first preferred embodiment are denoted by the same reference numerals, and description thereof is omitted as appropriate.

A marine propulsion system 202 according to the second preferred embodiment includes an outboard motor 102a and a controller C. Unlike the marine propulsion system 102 according to the first preferred embodiment, the marine propulsion system 202 according to the second preferred embodiment does not include a lithium-ion battery. Therefore, in principle, the marine propulsion system 202 does not drive a house device H while the generator 5 does not generate power such that the engine 1 is stopped. Thus, when the house device H is continuously used during navigation, the engine 1 of the marine propulsion system 202 is not stopped.

A DC-DC converter 8 of the outboard motor 102a is directly connected to the house device H by a wiring W3.

The remaining structures of the second preferred embodiment are similar to those of the first preferred embodiment.

According to the second preferred embodiment of the present invention, the following advantageous effects are achieved.

According to the second preferred embodiment of the present invention, the marine propulsion system 202 includes the capacitor 7 provided in the outboard motor 102a to smooth the power generated by the generator 5 and output the smoothed power to the house device H. Accordingly, the capacitor 7 in the outboard motor 102a smooths the power generated by the generator 5 (stabilizes the output). Furthermore, the marine propulsion system 202 includes the power distributor (DC-DC converter 8) provided in the outboard motor 102a to limit an output from the capacitor 7 to the house device H. Accordingly, the power distributor in the outboard motor 102a protects (retains) the power of a power supply of the outboard motor 102a including the capacitor 7. Thus, it is not necessary to provide a conventional battery on the hull 101 side to smooth power, and a conventional voltage sensing relay on the hull 101 side to limit an output from the outboard motor 102a to the hull 101 side, and thus a space for the house device H is increased in the hull.

Third Preferred Embodiment

A third preferred embodiment of the present invention is now described with reference to FIGS. 8 and 9. In the third preferred embodiment, an outboard motor 302a includes a relay switch 308, unlike the first preferred embodiment in which the outboard motor 102a includes the DC-DC converter 8. The same or similar structures as those of the first preferred embodiment are denoted by the same reference numerals, and description thereof is omitted as appropriate. The relay switch 308 is an example of a "power distributor" or a "first relay switch".

Figure 8:
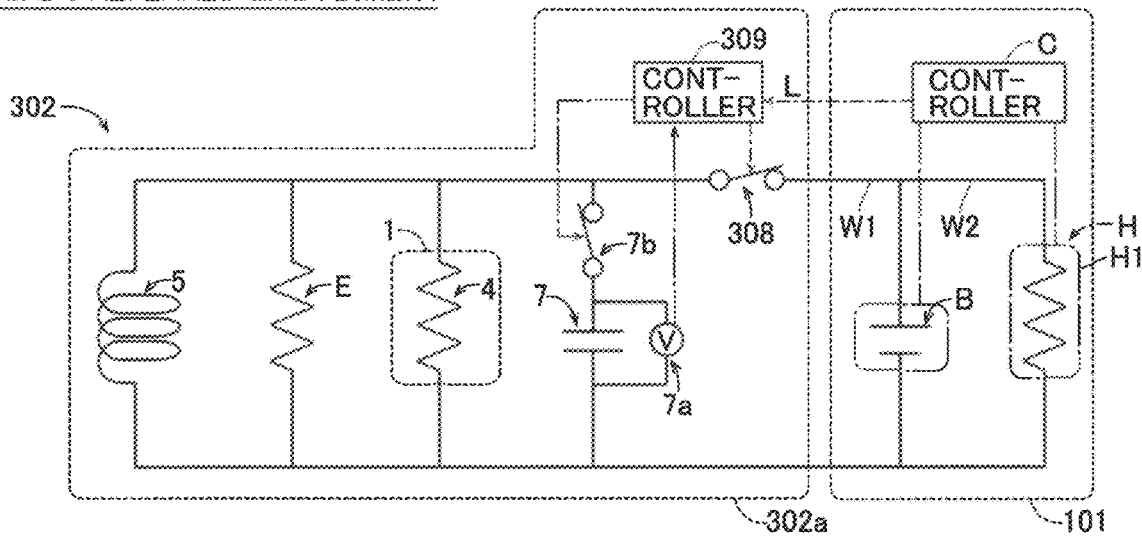
FIG. 8 is a diagram schematically showing a circuit including a capacitor and a DC-DC converter of a marine propulsion system according to a third preferred embodiment of the present invention.
Figure 9:
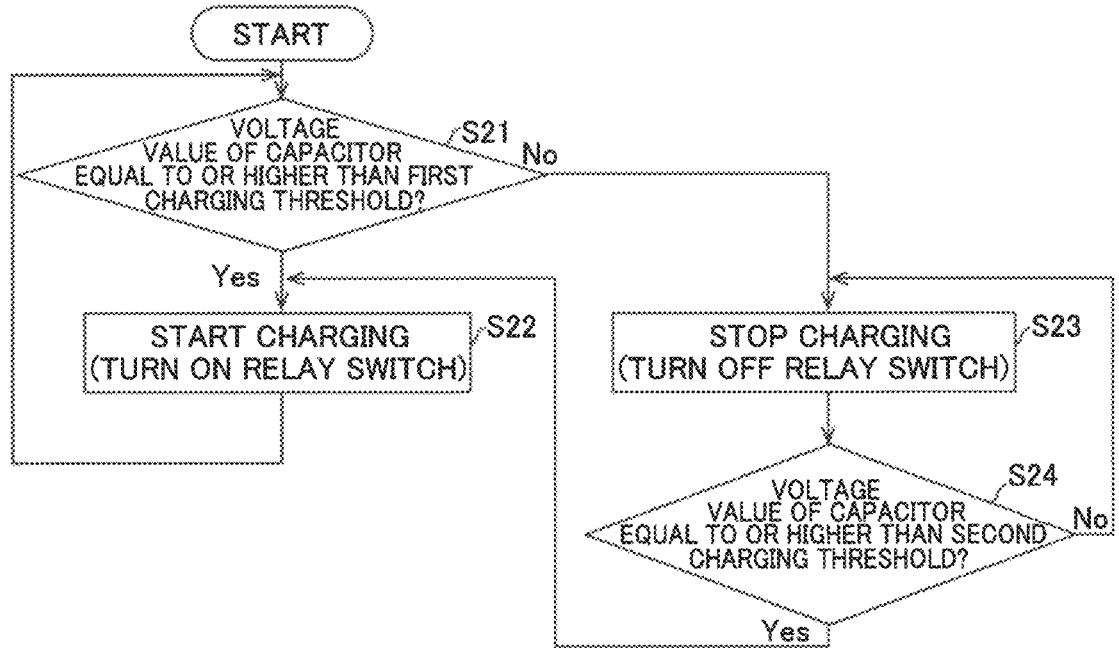
FIG. 9 is a flowchart of a control process performed by a controller of an outboard motor according to the third preferred embodiment of the present invention.

A marine propulsion system 302 according to the third preferred embodiment shown in FIG. 8 includes an outboard motor 302a including the relay switch 308 and a controller 309. Unlike the outboard motor 102a according to the first preferred embodiment, the outboard motor 302a does not include a DC-DC converter. When a voltage on the outboard motor 102a side and a voltage on the hull 101 side are the same as each other and it is not necessary to adjust the voltage between the outboard motor 102a and the hull 101, for example, the relay switch 308 is used instead of a DC-DC converter.

The relay switch 308 switches between an energization state and a cutoff state between a capacitor 7 and a house device H. Driving of the relay switch 308 is controlled by the controller 309 of the outboard motor 302a. The controller 309 performs a control to switch the relay switch 308 from the energization state to the cutoff state based on the house device H being in an overload state so as to limit an output from the capacitor 7 to the house device H. Furthermore, the controller 309 performs the following control based on the voltage value of the capacitor 7 (voltage sensor 7a).

A flow of a control process during driving of an engine 1 performed by the controller 309 is now described with reference to FIG. 9. As an example, the expression "during driving of an engine 1" indicates that the rotation speed of the engine 1 is about 500 rpm or more.

In step S21, it is determined whether or not the voltage value of the capacitor 7 acquired by the voltage sensor 7a is equal to or higher than a first charging threshold (45 [V], for example). When it is equal to or higher than the first charge threshold, the process advances to step S22, and when it is less than the first charge threshold, the process advances to step S23.

Then, in step S22, the relay switch 308 is turned on, and an output of a DC voltage having a predetermined voltage value to a lithium-ion battery B is started. That is, charging to the lithium-ion battery B is started. Consequently, power generated by a generator 5 is distributed and charged in the capacitor 7 and the lithium-ion battery B. Then, the process returns to step S21.

Then, in step S23, the relay switch 308 is turned off, and the output of the DC voltage to the lithium-ion battery B is stopped. That is, charging to the lithium-ion battery B is stopped. Consequently, the power generated by the generator 5 is intensively charged in the capacitor 7, and thus the capacitor 7 is effectively charged. The capacitor 7 is intensively charged such that when power is supplied from the capacitor 7 to a starter 4 to start the engine 1, for example, the starting the engine 1 is improved. Then, the process advances to step S24.

Then, in step S24, it is determined whether or not the voltage value of the capacitor 7 acquired by the voltage sensor 7a is equal to or higher than a second charging threshold (50 [V], for example). When it is equal to or higher than the second charging threshold, the process advances to step S22, and when it is less than the second charging threshold, the process returns to step S23.

The remaining structures of the third preferred embodiment are similar to those of the first preferred embodiment.

According to the third preferred embodiment of the present invention, the following advantageous effects are achieved.

According to the third preferred embodiment of the present invention, the marine propulsion system 302 includes the capacitor 7 provided in the outboard motor 302a to smooth the power generated by the generator 5 and output the smoothed power to the house device H. Accordingly, the capacitor 7 in the outboard motor 302a smooths the power generated by the generator 5 (stabilizes the output). Furthermore, the marine propulsion system 302 includes the power distributor (relay switch 308) provided in the outboard motor 302a to limit an output from the capacitor 7 to the house device H. Accordingly, the power distributor in the outboard motor 302a protects (retains) the power of a power supply of the outboard motor 302a including the capacitor 7. Thus, it is not necessary to provide a conventional battery on the hull 101 side to smooth power, and a conventional voltage sensing relay on the hull 101 side to limit an output from the outboard motor 302a to the hull 101 side, and thus a space for the house device H is increased in the hull.

According to the third preferred embodiment of the present invention, the power distributor provided in the outboard motor 302a includes the relay switch 308 to switch between the energization state and the cutoff state between the capacitor 7 and the house device H, and switches the relay switch 308 from the energization state to the cutoff state based on the house device H being in the overload state to limit the output from the capacitor 7 to the house device H. Accordingly, the output from the capacitor 7 to the house device H is limited by the relay switch 308 having a simple structure and provided in the outboard motor 302a.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the hull-side battery preferably includes a lithium-ion battery in each of the first and third preferred embodiments described above, the present invention is not restricted to this. In the present invention, the hull-side battery may alternatively include a different type of battery than a lithium-ion battery, such as a lead storage battery.

Figure 10:
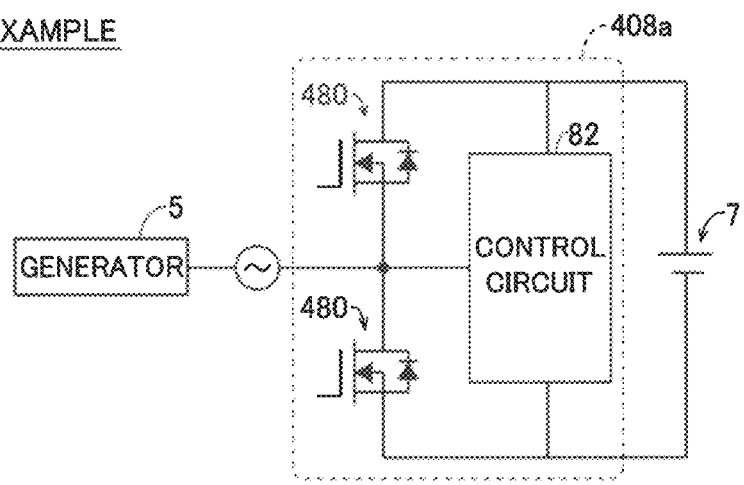
FIG. 10 is a diagram showing a charge control circuit of an outboard motor according to a modified example.

While the charge control circuit preferably shorts a generated current by the switching element to cut off the current from the generator to the capacitor in each of the first to third preferred embodiments described above, the present invention is not restricted to this. In the present invention, as in a charge control circuit 408a according to a modified example shown in FIG. 10, a switching element 480 may alternatively be opened to cut off a current from a generator 5 to a capacitor 7. Alternatively, the phase of the generator may be controlled to decrease a generated voltage such that the current from the generator to the capacitor is reduced or minimized.

While one outboard motor is preferably provided on the hull in each of the first to third preferred embodiments described above, the present invention is not restricted to this. In the present invention, a plurality of outboard motors may alternatively be provided on the hull.

While the capacitor and the power distributor are preferably provided in the cowling in each of the first to third preferred embodiments described above, the present invention is not restricted to this. In the present invention, the capacitor and the power distributor may alternatively be provided at a position different from the cowling, such as an upper case.

While the outboard motor preferably includes only the engine as a drive source to drive the propulsion generator in each of the first to third preferred embodiments described above, the present invention is not restricted to this. In the present invention, the outboard motor may alternatively include an electric motor in addition to the engine as a drive source to drive the propulsion generator. That is, the outboard motor may be a so-called hybrid outboard motor.

While the process operations performed by the controller of the outboard motor are described using flowcharts in a flow-driven manner in which processes are performed in order along a process flow for the convenience of illustration in each of the first to third preferred embodiments described above, the present invention is not restricted to this. In the present invention, the process operations performed by the controller of the outboard motor may alternatively be performed in an event-driven manner in which the processes are performed on an event basis. In this case, the process operations performed by the controller of the outboard motor may be performed in a complete event-driven manner or in a combination of an event-driven manner and a flow-driven manner.

While preferred embodiments of the present invention have been described above, variations and modifications will be apparent to those skilled in the art without departing from the scope and spirit of the present invention. The scope of the present invention, therefore, is to be determined solely by the following claims.

What is claimed is:

1. A marine propulsion system comprising:
   an outboard motor installed on a hull and including an engine to drive a propulsion generator, and a generator to generate power by driving of the engine;
   a capacitor provided in the outboard motor to smooth the power generated by the generator and output the smoothed power to a device on a hull side;
   a power distributor provided in the outboard motor to limit an output from the capacitor to the device on the hull side based on the device on the hull side being in an overload state in which power equal to or higher than a first threshold is consumed; and
   a charge control circuit to perform a control to limit a supply of power from the generator to the capacitor to charge the capacitor based on the device on the hull side being in a low load state in which power less than a second threshold that is smaller than the first threshold is consumed.

2. The marine propulsion system according to claim 1, wherein the power distributor includes a DC-DC converter to transform a DC voltage output from the capacitor to the device on the hull side, and to limit the output from the capacitor to the device on the hull side by at least one of turning off the DC-DC converter based on the device on the hull side being in the overload state or setting an upper limit for an output of the DC-DC converter.

3. The marine propulsion system according to claim 1, wherein the power distributor includes a first relay switch to switch between an energization state and a cutoff state between the capacitor and the device on the hull side, and to switch the first relay switch from the energization state to the cutoff state based on the device on the hull side being in the overload state to limit the output from the capacitor to the device on the hull side.

4. The marine propulsion system according to claim 1, further comprising:
   an electric starter to start the engine; wherein
   the capacitor supplies to the electric starter power to start the engine.

5. The marine propulsion system according to claim 4, further comprising:
   a second relay switch to switch between an energization state and a cutoff state between the capacitor and the electric starter.

6. The marine propulsion system according to claim 1, further comprising:
   a voltage sensor to detect a voltage value of the capacitor; wherein
   the marine propulsion system limits the output from the capacitor to the device on the hull side based on the voltage value of the capacitor detected by the voltage sensor being less than a voltage threshold.

7. The marine propulsion system according to claim 1, wherein
   the device on the hull side includes an electrically driven device and a hull-side battery to supply, to the electrically driven device, power to drive the electrically driven device; and
   the capacitor charges the hull-side battery by smoothing the power generated by the generator and outputting the smoothed power to the hull-side battery.

8. The marine propulsion system according to claim 7, wherein the hull-side battery includes a lithium-ion battery.

9. The marine propulsion system according to claim 1, wherein
   the outboard motor further includes a cowling to house the engine; and
   the capacitor and the power distributor are provided in the cowling.

10. The marine propulsion system according to claim 1, wherein
    the device on the hull side includes an inverter to convert a direct current into an alternating current, and an electrically driven device driven by the alternating current from the inverter; and
    the capacitor smooths the power generated by the generator and outputs the smoothed power to the electrically driven device via the inverter on the hull side.

11. The marine propulsion system according to claim 10, wherein
    the electrically driven device includes an air conditioner to adjust an air condition in the hull; and
    the capacitor smooths the power generated by the generator and outputs the smoothed power to the air conditioner via the inverter.

12. An outboard motor comprising:
    an engine to drive a propulsion generator;
    a generator to generate power by driving of the engine;

a capacitor to smooth the power generated by the generator and output the smoothed power to a device on a hull side;

a power distributor to limit an output from the capacitor to the device on the hull side based on the device on the hull side being in an overload state in which power equal to or higher than a first threshold is consumed; and a charge control circuit to perform a control to limit a supply of power from the generator to the capacitor to charge the capacitor based on the device on the hull side being in a low load state in which power less than a second threshold that is smaller than the first threshold is consumed.

13. The outboard motor according to claim 12, wherein the power distributor includes a DC-DC converter to transform a DC voltage output from the capacitor to the device on the hull side, and to limit the output from the capacitor to the device on the hull side by at least one of turning off the DC-DC converter based on the device on the hull side being in the overload state or setting an upper limit for an output of the DC-DC converter.

14. The outboard motor according to claim 12, wherein the power distributor includes a relay switch to switch between an energization state and a cutoff state between the capacitor and the device on the hull side, and to switch the relay switch from the energization state to the cutoff state based on the device on the hull side being in the overload state to limit the output from the capacitor to the device on the hull side.

15. The outboard motor according to claim 12, further comprising:

an electric starter to start the engine; wherein the capacitor supplies to the electric starter power to start the engine.

16. A marine vessel comprising:

a hull;

an outboard motor installed on the hull and including an engine to drive a propulsion generator, and a generator to generate power by driving of the engine;

a capacitor provided in the outboard motor to smooth the power generated by the generator and output the smoothed power to a device on a hull side;

a power distributor provided in the outboard motor to limit an output from the capacitor to the device on the hull side based on the device on the hull side being in an overload state in which power equal to or higher than a first threshold is consumed; and a charge control circuit to perform a control to limit a supply of power from the generator to the capacitor to charge the capacitor based on the device on the hull side being in a low load state in which power less than a second threshold that is smaller than the first threshold is consumed.

* * * * *